US008633967B2

(12) United States Patent
Kamins-Naske et al.

(10) Patent No.: US 8,633,967 B2
(45) Date of Patent: Jan. 21, 2014

(54) METHOD AND DEVICE FOR THE CREATION OF PSEUDO-HOLOGRAPHIC IMAGES

(75) Inventors: Sigrid Kamins-Naske, Kakenstorf (DE); Ivo-Henning Naske, Kakenstorf (DE); Valerie Antonia Naske, Kakenstorf (DE)

(73) Assignee: Expert Treuhand GmbH, Hamburg (DE)

( * ) Notice: Subject to any disclaimer, the term of this patent is extended or adjusted under 35 U.S.C. 154(b) by 851 days.

(21) Appl. No.: 12/298,020

(22) PCT Filed: Apr. 23, 2007

(86) PCT No.: PCT/EP2007/003546
§ 371 (c)(1),
(2), (4) Date: Mar. 6, 2009

(87) PCT Pub. No.: WO2007/121970
PCT Pub. Date: Nov. 1, 2007

(65) Prior Publication Data
US 2010/0171811 A1 Jul. 8, 2010

(30) Foreign Application Priority Data

Apr. 21, 2006 (DE) .......................... 10 2006 019 169

(51) Int. Cl.
H04N 13/02 (2006.01)
(52) U.S. Cl.
USPC ................................ 348/46; 348/42; 348/44
(58) Field of Classification Search
USPC ................................ 348/42, 44, 46; 345/419
See application file for complete search history.

(56) References Cited

U.S. PATENT DOCUMENTS

| | | | | |
|---|---|---|---|---|
| 6,816,158 B1* | 11/2004 | Lemelson et al. | ............ | 345/419 |
| 7,023,466 B2* | 4/2006 | Favalora et al. | ............ | 348/42 |
| 7,239,293 B2* | 7/2007 | Perlin et al. | ............ | 345/7 |
| 2002/0135673 A1* | 9/2002 | Favalora et al. | ............ | 348/42 |
| 2003/0026474 A1* | 2/2003 | Yano | ............ | 382/154 |
| 2004/0100464 A1* | 5/2004 | Oh et al. | ............ | 345/419 |
| 2005/0059886 A1* | 3/2005 | Webber | ............ | 600/426 |
| 2006/0003805 A1* | 1/2006 | Richardson et al. | ............ | 455/558 |

OTHER PUBLICATIONS

Ho-Chao Huang, et al; Generation of Multiviewpoint Video from Stereoscopic Video; IEEE Transactions on Consumer Electronics, IEEE Service Center, New York, NY, US; vol. 45 No. 1, Feb. 1999; pp. 124-134.

Emile A. Hendriks, et al; Real Time Synthesis of Digital Multi Viewpoint Stereoscopic Images; Proceedings of the SPIE, SPIE, Bellingham, VA, US; vol. 3639, Jan. 25, 1999; pp. 266-276.

* cited by examiner

Primary Examiner — Liangche A Wang
(74) Attorney, Agent, or Firm — Maschoff Brennan

(57) ABSTRACT

A method and a device enable the creation of three-dimensional images with more than two perspectives (e.g. pseudo-holographic images), especially to be reproduced with the aid of an autostereoscopic display or an autostereoscopic screen, from fed images having, in particular, only two perspectives, e.g., a left and a right image channel. Also, a related device creates and reproduces three-dimensional images having more than two perspectives, especially in the form of an autostereoscopic multi-user visualization system.

14 Claims, 12 Drawing Sheets

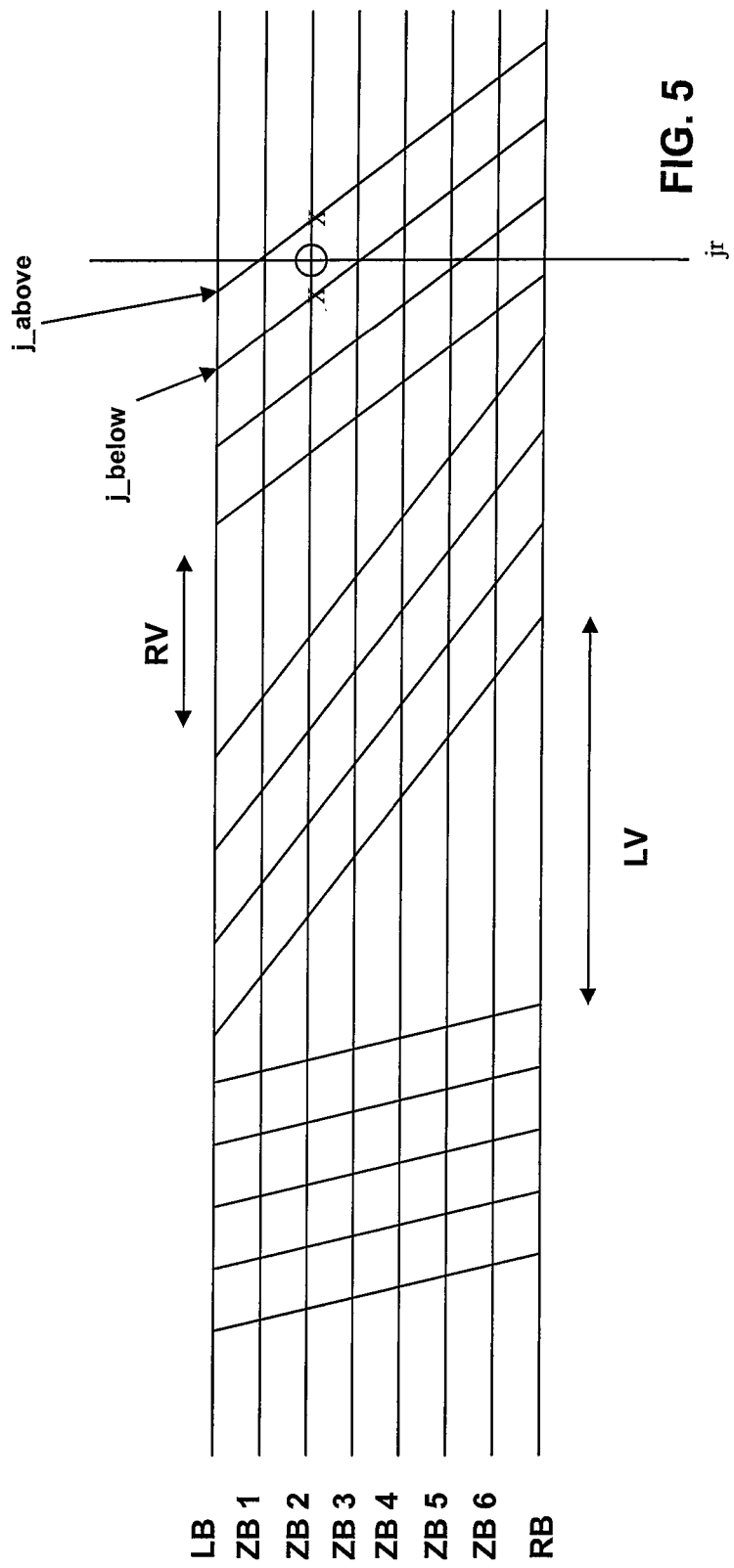

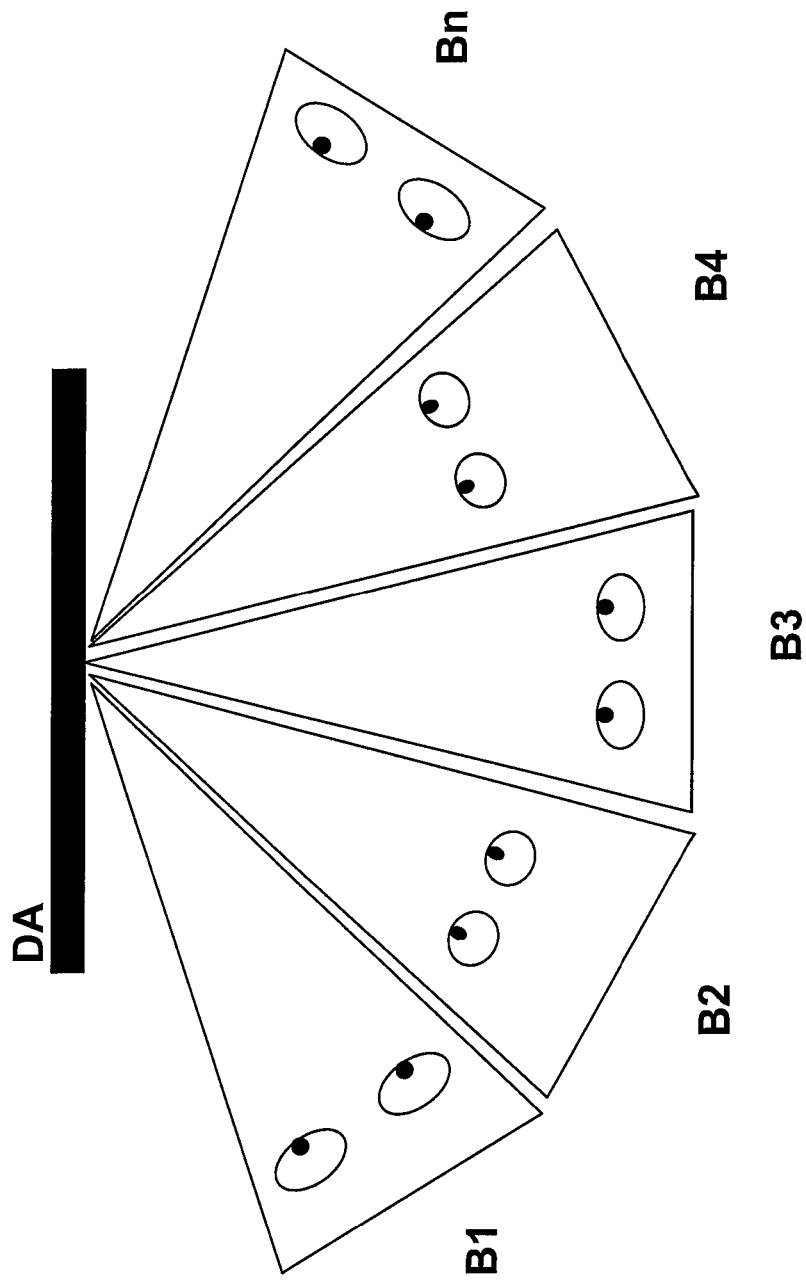

METHOD AND DEVICE FOR THE CREATION OF PSEUDO-HOLOGRAPHIC IMAGES

The invention is related to a method and a device for the creation of three dimensional images with more than two perspectives (such as pseudo-holographic images), especially for displaying on an autostereoscopic display or an autostereoscopic screen from fed images with, in particular, only two perspectives as, for example, from left and right image channels. The invention is also related to a device for the creation and display of three dimensional images with more than two perspectives, especially with an autostereoscopic multiuser visualization system (multiview system).

Autostereoscopic visualization systems will allow one or more viewers looking at an autostereoscopic display or an autostereocopic screen, to view a three dimensional image without visual aids such as red/blue glasses, shutter or polarization glasses. For this purpose for example parallax barrier systems or lenticular systems, which will be attached to a display, are used. But because, as described in FIG. 10, one or more viewers B1, . . . Bn will be at different angles relative to the perpendicular direction of the display or the screen DA, there must be more than two perspectives generated and presented to the left or right eye in order to allow in all positions S1 to Sn and all viewers B1 to Bn respectively a nearly natural three dimensional image to be viewed. Therefore, these systems are called multi-user or multiview systems.

One great problem, mainly if the number of perspectives is very high, is that the hardware capacity of the visualization system used and, in particular, the memory capacity required is very large.

The purpose of the invention presented here is to describe a method and device for the creation of three dimensional (especially moving) images with more than two perspectives (such as pseudo-holographic images) from fed images with, in particular, only two perspectives as, for example, from left and right image channels, with which a relatively large number of such perspectives can be synthesized with a relatively small amount of memory.

Furthermore, a device for the creation and display of three dimensional (mainly moving) images with more than two perspectives, especially in the form of an autostereoscopic multi-viewer visualization system (multiview system), shall be described, which, especially for a comparably large number of displayed perspectives, the requirements for the hardware, mainly the memory, are relatively small and therefore relatively inexpensive.

This problem will be solved with a method as described in claim 1 and a device as described in claim 7 or with a multiuser visualization system as described in claim 9.

One advantage of the invention described is that the number of perspectives which have to be generated can be arbitrarily by the user.

The sub-claims contain useful extensions of the invention.

Additional details, features and advantages of the invention are contained in the following description of exemplary and preferred embodiments.

The figures contain:

FIG. 5 is a schematic presentation of correspondences and a right and left occultation of FIG. 2 for a first synthesis situation;

FIG. 10 is a schematic diagram of the position and viewing angle of different viewers in several viewing zones of a multiview display.

Figure 1:
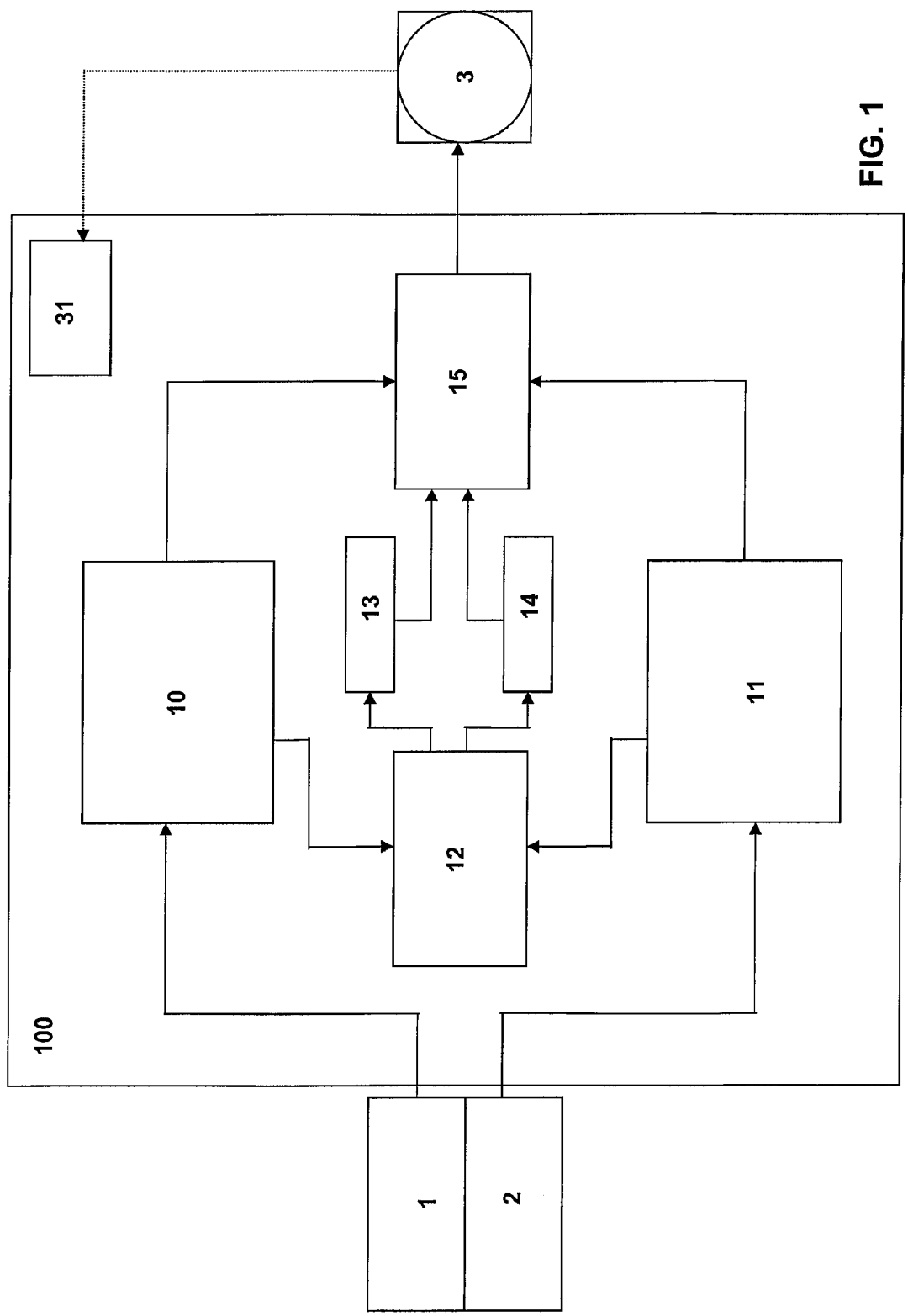
FIG. 1 is a schematic block diagram of a multiview system with a device for the creation of images according to the invention.

As previously mentioned, an autostereocopic multi-viewer visualization display DA (Multiview display) or autostereocopic screen is generating according to FIG. 10 several viewing zones S1, . . . Sn, in which a viewer B1, . . . Bn can view an optimal three dimensional image.

For this purpose a number N (N>2) of perspectives of the image which will be presented, have to be merged (from now on called "merging") so that the autostereoscopic display based on the installed optics will split those perspectives for every viewer B1, . . . Bn, so that every eye of every viewer B1, . . . Bn can view a different perspective in every viewing zone S1, . . . , Sn and thus generates a three dimensional image impression for every viewer.

Consequently, in general a predefined number of in-between perspectives have to be created from two fed image perspectives, meaning a left and a right image, and to be merged so that the visualization system or display can correctly process and display them.

The number and position of the viewing zones S1, . . . Sn, which will be created depends on the number N of visualized and merged perspectives. The more perspectives which are available, the broader the viewing zones will be and the more the transition zones will be shifted to the left and right border of the viewing area in front of the display DA.

If a viewer B1, . . . Bn moves in front of the display DA (or the screen) from one viewing zone Sx to a neighboring viewing zone Sx+1, a stripe of fuzziness will be seen to move through the image.

It is therefore the aim to have the number N of perspectives as large as possible. But this will cause the problem that, with an increasing number of perspectives, the requirements for the hardware and especially the memory capacity of the underlying visualization system will increase significantly, which, in practice, will limit the ability of the system to generate or display the number of perspectives required.

With the invention presented here, a method and device for the creation of three dimensional images with a plurality of merged perspectives from fed images, especially only two fed perspectives, will be described. The invention generates the displayed pixels with an arbitrary number of in-between perspectives in such an efficient way that only those image pixels of an in-between image (or in-between perspective) which are displayed on the multiview display will be synthesized.

The image pixels will not be addressed separately, but will be created directly on the display, which means that the complete in-between perspectives are never generated, never exist at any time and therefore do not need to be stored.

With the method according to the invention, the viewer has the option to choose an arbitrary number N (N>2) of perspectives which have to be visualized on the display or cinema screen. Furthermore, it is assumed, that only a number M of (fed) perspectives are stored in memory, so that a number N−M of in-between images or in-between perspectives have to be synthesized.

To simplify the remainder of the description, the commonly used case in which only two perspectives M, in particular a left and a right fed image, are available in memory (or in a dedicated memory for the left and right image). Of course, the method according to the invention can be applied to more than two fed perspectives (M>2) for the creation of the required number N−M of in-between images or perspectives. In this case, the method will be used for the left-most and right-most fed perspectives, while the in-between fed perspectives will be used as supporting images.

The method according to the invention for the creation of the in-between images (or in-between perspectives) covers a correspondence analysis and an in-between images (or in-between perspective) synthesis phase. During the analysis phase for each pixel B(i,j) of the fed left image an attempt is made to find a corresponding right pixel B(i',j') (the terms "in-between images" and "in-between perspectives" will be used synonymously).

The index i or i' defines the number of the row (row index) and the index j or j' defines the column (column index) within each image. To simplify the remainder of the description, it is assumed from now on that i=i' holds. This is feasible if the images are in normalized stereo form, which can always be achieved through a pre-processing or transformation of the relevant images.

If the correspondence B(i,j)→B(i,j') is known and correct, during the synthesis phase all in-between images (in-between perspectives) can be extracted or synthesized by a virtual camera movement on the stereo basis from the left image to the right image (or vice versa).

If $j(.alpha.):=(1-.alpha.)*j+.alpha.*j'$ for $0<=.alpha.<=1$, is set, it will be defined:

$B(i,j(.alpha.)):=B(i,j)$ for $0<=.alpha.<=1$.

This means, in particular, that $B(i,j(0))=B(i,j)$ and $B(i,j(1))=B(i,j')$ holds, because B(i,j') is the corresponding pixel of B(i,j).

If .alpha. moves from 0 to 1, then B(i,j) moves on a virtual camera path from B(i,j) to B(i,j'), its corresponding pixel.

Provided that N−2 in-between images have to be created (meaning M=2), .alpha.k supporting points with $0<.alpha.k<1$ for $k=1, \ldots, N-2$, have to be used, where the pixels B(i,j(.alpha.k)) will be combined into one in-between image. Here, preferably .alpha.k:=k/(N−1) will be defined equidistantly.

Now, right occultations are those pixels B(i,j), which only exist in the left image and which are invisible for the right eye. For those pixels there is no correspondence in the right image. During a virtual camera movement from the left image to the right image those pixels have to be removed successively. This will start on the right border of the right occultation.

In a similar manner, left occultations are those pixels B(i',j'), which only exist in the right image and which are invisible for the left eye. For those pixels there is no correspondence in the left image. During a virtual camera movement from the left image to the right image those pixels have to be inserted successively. This will start on the right border of the left occultation.

FIG. 1 shows a schematic block diagram of a multiview system with a device 100 according to the invention for the creation of three dimensional images with more than two perspectives. The device 100 is connected via a first input with a left channel 1 for the feed with left (moving or still) images and via a second input with a right channel 2 for the feed with right (moving or still) images, meaning two perspectives of a three dimensional image. A controllable autostereoscopic multiview display 3 is connected via an output with the device 100.

The device 100 essentially includes a first image buffer 10 for at least one left image and a second image buffer 11 for at least one right image, which are connected with the associated first or second input of the device 100. The images stored in buffer 10 and 11 will be fed to the analysis unit 12 executing the correspondence analysis. The first output of analysis unit 12 is connected with a first buffer 13 for a generated indicator "Occultation(i,j)", while the second output of the analysis unit 12 is connected with second buffer 14 for a pointer "Whereto(i,j)" as well generated by the analysis unit 12.

The indicator Occultation(i,j) stored in the first buffer 13 will be fed to a first input of an image synthesis unit 15, while the pointer Whereto(i,j) stored in buffer 14 will be fed to the second input of the image synthesis unit 15. A third input of the image synthesis unit 15 receives a left image from the first image buffer 10, while a fourth input receives a right image from a second image buffer 11. The merged left and right images and the synthesized in-between images or in-between perspectives will be fed through the output of the image synthesis unit 15 to the autostereocopic multiview display 3 for presentation.

The device 100 preferably also includes a buffer 31 for a matrix R(i,jr) of perspectives, which, for each subpixel of the connected display 3 depending on its optical properties, describe which perspective (meaning fed (left or right) image or one of the synthesized in-between perspectives) has to be presented by that subpixel. The matrix R(i,j) has either to be computed before starting the display 3 with the methods according to the invention (FIGS. 3A, 3B, 4A, 4B) and to be stored in buffer 31, or, if it is stored in the display, to be downloaded from the display 3 to the buffer 31, or has to be fed in any other manner to the device 100. The matrix can be computed in well-known ways for any applicable autostereoscopic display 3.

In the following description of a first embodiment according to the invention as shown in the flow chart described in FIGS. 3A and 3B each in-between image represents one of the in-between perspectives.

To improve the speed of the synthesis of the in-between images, unused pixels of each in-between perspective will not be generated. The following procedure will be applied:

For each pixel/subpixel P(i,l) of the display 3, based on the previously described matrix, it can be identified from which perspective R(i,l) ($0<=R(i,l)<=N-1$) the pixel to be presented has to be taken.

Therefore, it will be defined:

For all columns j of the image area and each k=1, . . . , N for which there is a correspondence in the right image, $l:=(1-.alpha.k)*j+.alpha.k*j'$ compute and set P(i,l):=B(i,j), if k=R(i,l) is true.

For the left and right occultations, for which there is no correspondence B(i,j)→B(i,j'), the procedure is as follows:

A right occultation, which is present in the left image and not in the right will be faded out during the virtual camera movement from left to right. In this case, the occultation will move from the right occultation border to the left. The length of the visible occultation stripe in the row is known for each perspective. Furthermore, it is known where this stripe in perspective k will be mapped to. Therefore, a check can be made for all pixels whether k=R(i,l) is true. Only those pixels will be inserted at P(i,l).

This will be executed in the same way for the left occultations.

Figure 3A:
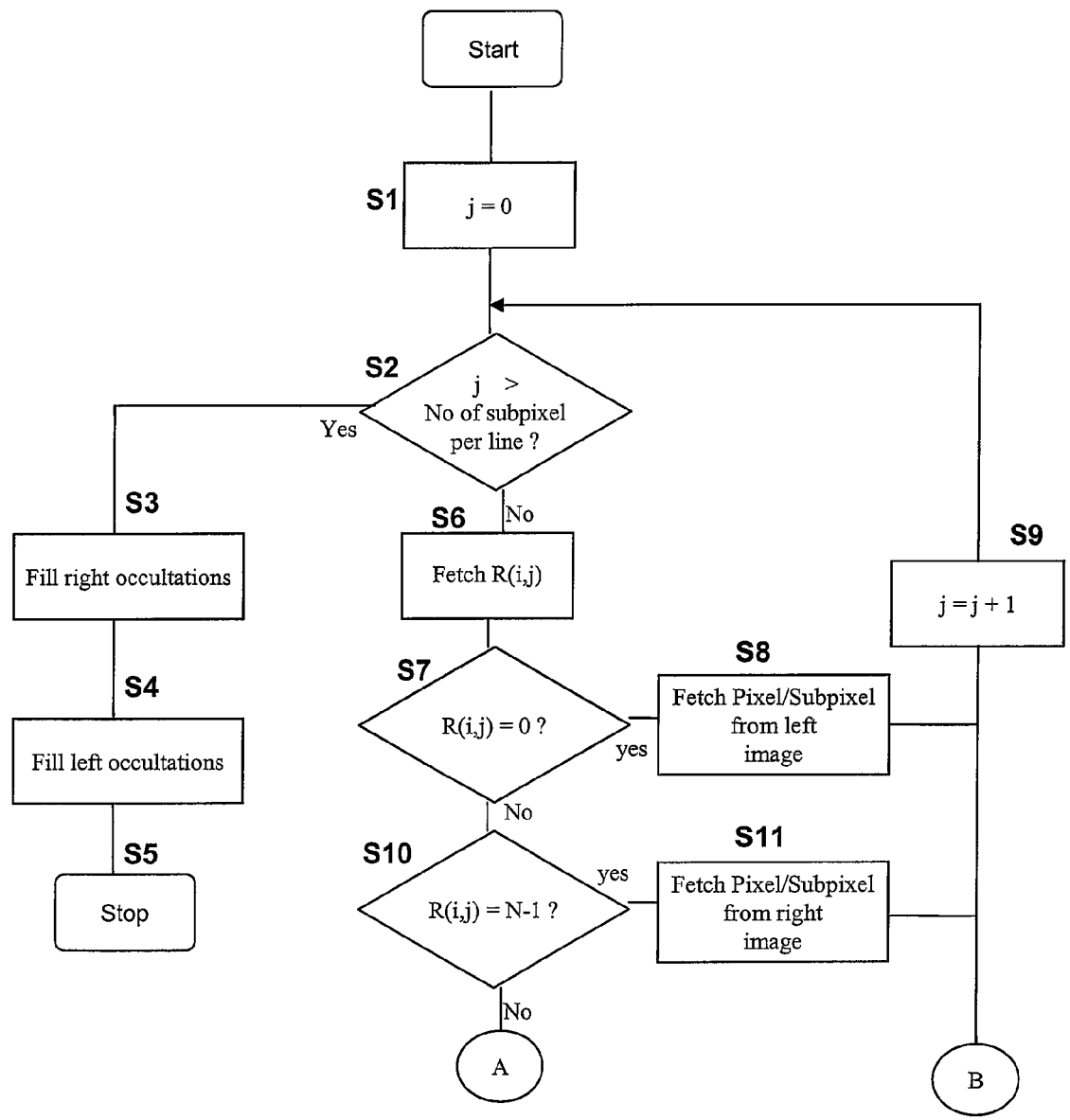
FIG. 3 is a flow chart of a first embodiment according to the invention for the generation of three dimensional images.
Figure 3B:
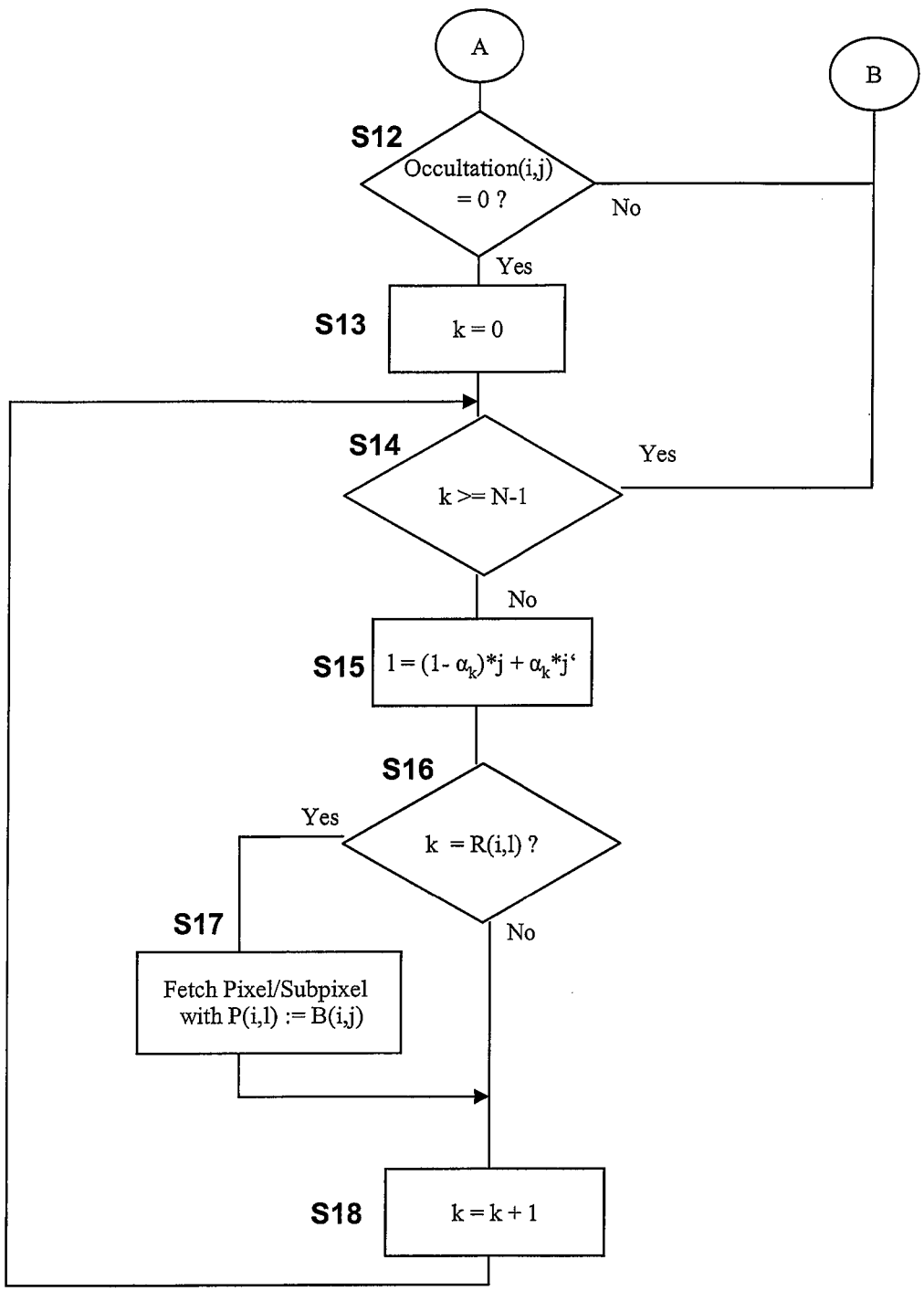

Therefore, for each row i of the image the method according to the invention will be executed as described in the flow chart of FIGS. 3A and 3B:

After starting the method (which can be executed on a pixel or subpixel level) in a first step S1 a pointer j indicating a pixel or subpixel respectively (column index) will be set to 0.

After that, with step S2 a loop for all pixels or subpixels j respectively of a row i, for which the method has to be executed at this moment starts. If according to this check S2 j is larger than the number of pixels or subpixels of a row respectively the method will continue with step S3, which will fill the right occultations. After that, left occultations will be filled in step S4 and the method finally finished with step S5 for the current row i and if necessary with "start" for the next row restarted.

But if the check in step S2 returns "no" with step S6 for the pixel or subpixel j respectively the perspective R(i,j) will be fetched from buffer 31, which has to be displayed for this pixel or subpixel respectively.

But if the check in step S7 shows perspective R(i,j)=0 the pixel or subpixel respectively will be fetched in step S8 from the left image. After that, in step S9 the column index j will be incremented by 1, it will be stepped back to S2 to repeat this procedure.

But if the question according to step S7 is answered with "no", it will be checked according to step S10 whether the perspective R(i,j) is equal to N−1. If this is the case the pixel or subpixel respectively will be fetched from the right image. After that, the column index j will be incremented by 1 according to step S9, it will be stepped back to S2 to repeat this procedure.

But if the check in step S10 is answered with "no" it will be checked in step S12, whether the indicator Occultation(i,j)=0 (see below) is. If this is not the case it will be stepped back with step S9, which increments the column index j by 1 and the procedure repeated with step S2.

If the indicator Occultation(i,j) is equal to 0 (meaning that for a pixel in the right image a corresponding pixel in the left image exists) in step S13 k=0 will be set and with step S14 it will be checked, if k>N minus 1 is true. If this is true a step back to S9 will be done, which again increments the column index j by 1, and the process repeated with step S2.

But if the question of step S14 is answered with "no", $1:=(1-\alpha k) \cdot j + \alpha k \cdot j'$ will be set and with step S16 is will be checked if k=R(i,l) is. If this is not the case according to step S18 k will be incremented by 1.

But if the question according to step S16 is answered with "yes" according to step S17 the next pixel or subpixel with P(i,l):=B(i,j) will be fetched and it will be continued with step S18. After step S18 it will be stepped back to step S14 and the process repeated with this step S14.

In a second embodiment according to the invention, again each in-between image will represent one perspective.

In this case, it will be computed backwards which perspective and which displacement has to be applied for each display pixel/display subpixel.

In detail, the procedure will be as follows:

Again it is assumed that the images are available in stereo normalized form, such that each row in the left image corresponds with its associated row in the right image. This again can be achieved by a pre-executed transformation.

Furthermore, the columns i shall be fixed.

For each pixel B(i,j) in the left image an indicator Occultation(i,j) and a pointer Whereto(i,j) will be generated with the analysis unit 12.

The indicator Occultation(i,j) shows whether there is a corresponding pixel B(i,j') in the right image for the pixel B(i,j) of the left image, if it is contained in a right occultation or if there is a left occultation in the right image left of this pixel. Based on this the values of Occultation(i,j) will be defined by the analysis unit 12 as follows: 1, if there is a left occultation left of the pointer Whereto(i,j), Occultation(i,j)=0, if there is a correspondence in the right image, −1, if the pixel B(i,j) is part of a right occultation.

For the pointer Whereto(i,j) it is Whereto(i,j)=j', if Occultation(i,j)=0 is true, otherwise Whereto(i,j) is undefined.

Figure 2:
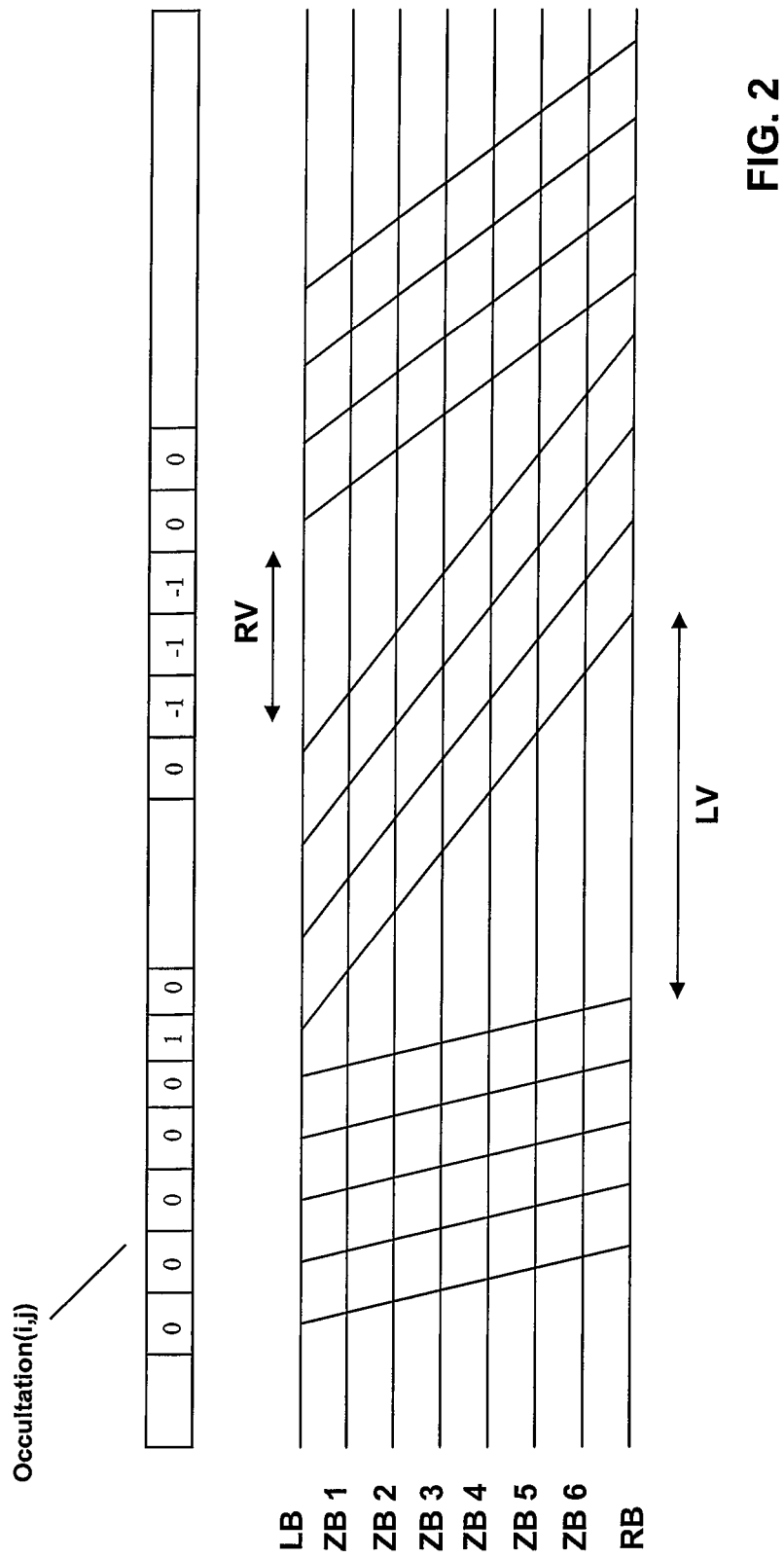
FIG. 2 is a schematic presentation of various correspondences, a right and left occultation respectively, between a left image, a right image and six in-between perspectives.

In FIG. 2, the values of Occultation(i,j) defined above as well as the different possibilities of a correspondence of the right occultations RV and a left occultation LV are shown for eight perspectives, namely a left image LB, first to sixth in-between images ZB1, . . . , ZB6 and a right image RB.

This method according to the invention will be applied to each row i of the image according to the flow chart described in FIGS. 4A and 4B (second embodiment of the invention) and executed as follows):

After starting the method, in a step S1 a pointer jr to a subpixel and a pointer jl to a pixel will be set to 0. Furthermore, the pointer jl will be incremented in a step S1a by 1 until the indicator Occultation(i,j) is larger or equal to 0 (a check for this is implied as part of step S1a).

When this is the case, a loop starts to run with step S2 through all subpixels jr of row i (to which the method is currently applied). The pixel (i,jl) is the pixel belonging to the subpixel jr, where the pixel is usually composed of the subpixels R, G, B.

If the check in step S2 indicates jr is larger than the number of subpixels per row, the method will stop for the current row i with step 7 and, if necessary, will be started with "Start" for the next row. Otherwise, according to step S3 for jr the next perspective R(i,jr), which has to be displayed for subpixel jr will be fetched from buffer 31.

If the check with step S4 indicates perspective "R(i,j)=0" ("yes"), the subpixel will be fetched according to step S8 from the left image. Additionally, according to step S10, jr will be incremented by 1 and it will then be stepped back to step S2 to repeat this procedure.

But if the check returns "no" in step S4 (meaning R(i,jr) is not 0), in step S5 it will be tested if "R(i,jr)=N−1" (N=number of perspectives) is true. If this is the case, the subpixel will be fetched according to step S9 from the right image. Additionally, according to step S10, jr will be incremented by 1 and it will then be stepped back to step S2 to repeat this procedure.

But if the step S5 returns "no" (meaning R(i,jr) not equal N−1), the core search process will start with step S6 with defining "above=false" and "below =false".

Figure 6:
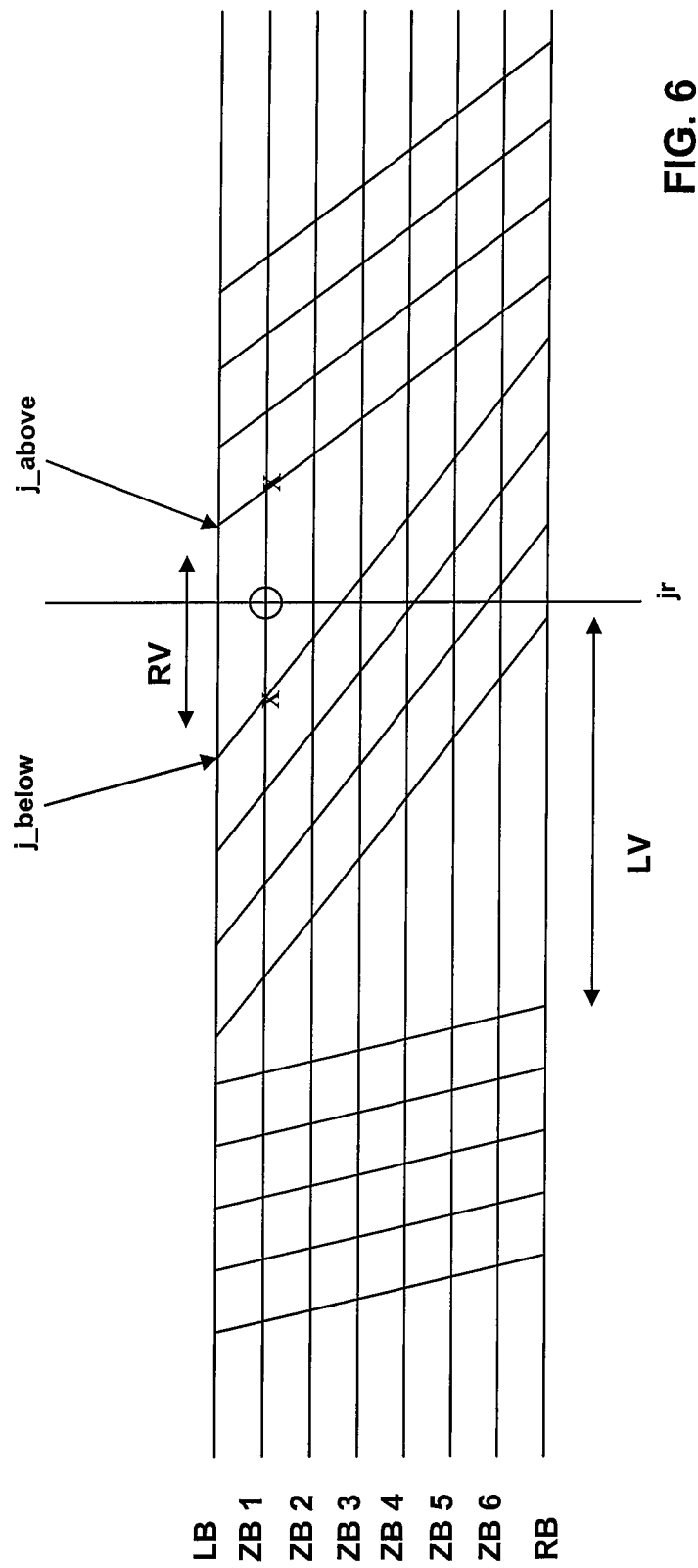
FIG. 6 is a schematic presentation of correspondences and a right and left occultation of FIG. 2 for a second synthesis situation.
Figure 7:
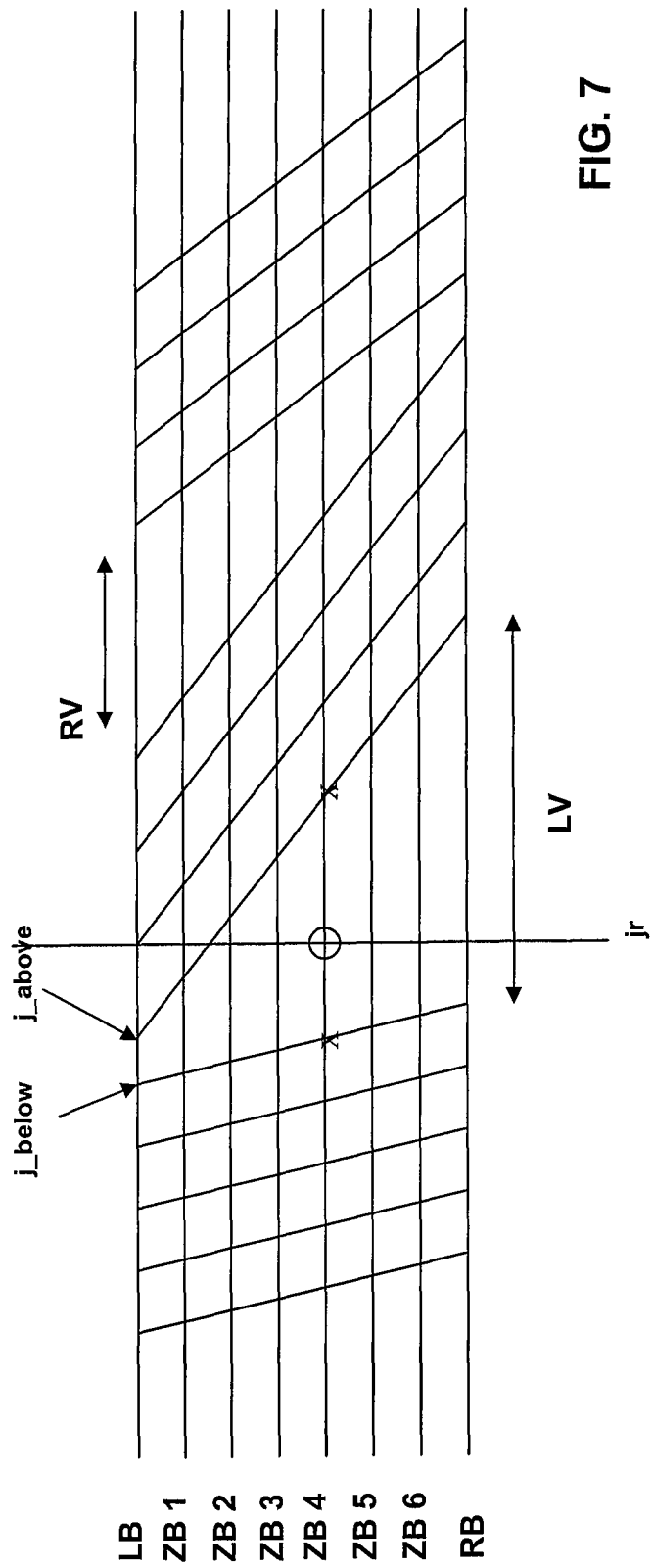
FIG. 7 is a schematic presentation of correspondences and a right and left occultation of FIG. 2 for a third synthesis situation.

If the question of step S11 either "above=false" and "below =false" is answered with "yes", then the subpixel is not yet encapsulated from above or below and the search process has to be continued with steps S12 to S17. But if step S11 can be answered with "no", the subpixel is encapsulated and can be fetched according to step S18 either from the left or right image. For this step four cases have to be distinguished:

j_above−j_below<=1 and Whereto(i,j_above)−
 Whereto(i,j_below)<=1:  Case 1:

In this case there is a unique correspondence and the subpixel can be fetched from the left image. This case is schematically shown in FIG. 5. Here, a pixel from the left image has to be selected, which is the result from j_above and j_below in in-between image (in-between perspective) ZB2.

j_above−j_below>1 and Whereto(i,j_above)−
  Whereto(i,j_below)<=1:  Case 2:

In this case there is a right occultation and the subpixel can be fetched from the left image. This case is schematically shown in FIG. 6.

j_above−j_below<=1 and Whereto(i,j_above)−
  Whereto(i,j_below)>1:  Case 3:

In this case there is a left occultation and the subpixel can be fetched from the right image. This case is schematically shown in FIG. 7.

j_above−j_below>1 and Whereto(i,j_above)−
  Whereto(i,j_below)>1:  Case 4:

This case is not feasible in reality, as a right and a left occultation cannot be in the same area at the same time.

Figure 4A:
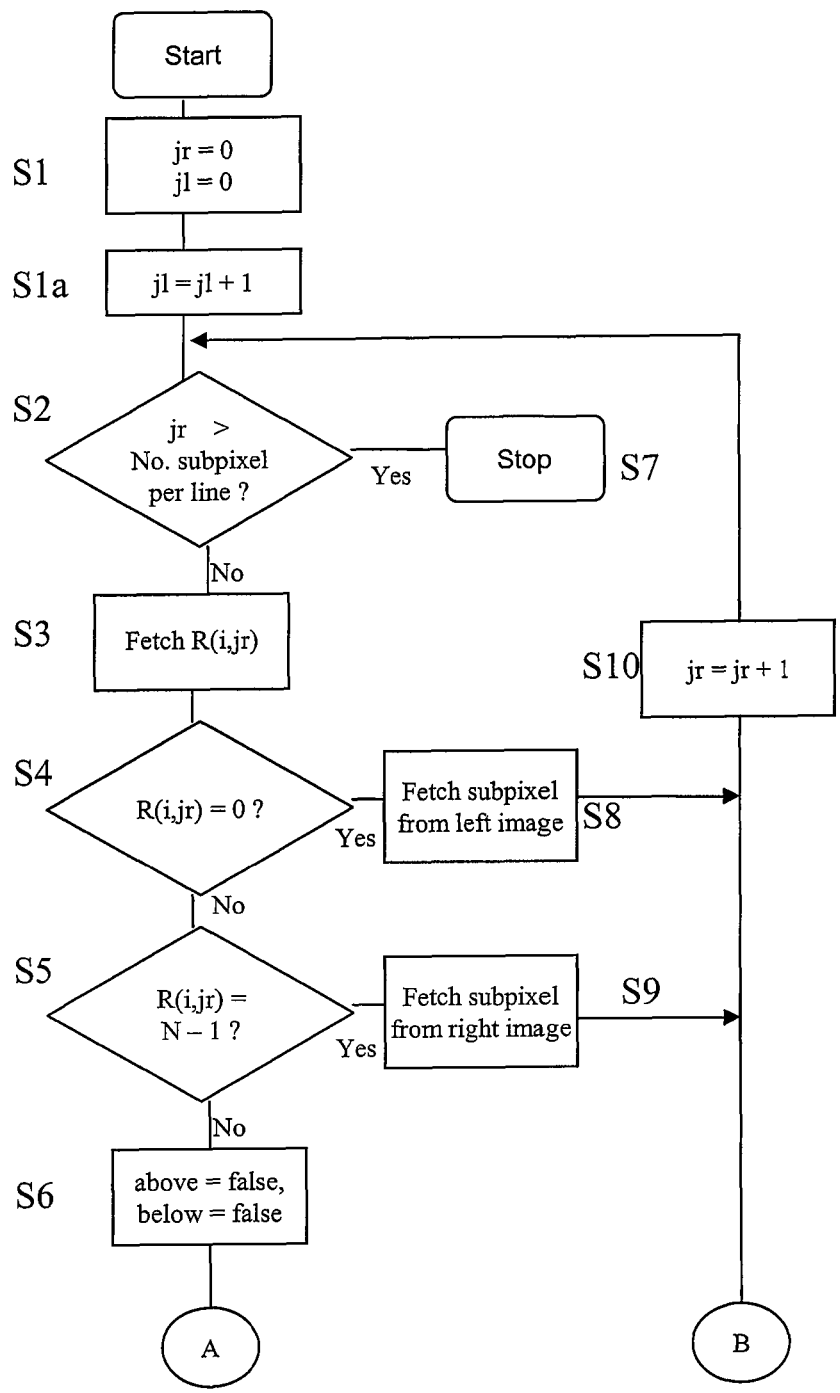
FIG. 4 is a flow chart of a second embodiment according to the invention for the generation of three dimensional images.

After that, step S18 according to FIG. 4A and step S10 jr will be incremented by 1, stepped back to step S2 and the process repeated.

But if the question according to step S11 is answered with "yes", according to step S12 a new positition jl_Position-New" will be computed. Furthermore, depending on perspective R(i,jr) it will be computed where the pixel B(i, jl) would be mapped to.

If, according to the check in step S13, the new position is jl_PositionNew=Pixel(i,jr), then the mapped pixel is found. Then, according to step S15, "above=true" and "below=true", "j_above=jl" and "j_below=jl" will be set and the subpixel will be fetched by answering the question of step S11 with "no" according to step S18 and the cases described above.

But if the check in step S13 returns "no" and according to the question of step S14 the new position is jl_PositionNew>pixel(i,jr)" ("yes"), this pixel is located above pixel(i,jr). Now, according to step S16, "above=true" and "j_above=jl" will be set and jl decremented by 1. Furthermore, it will be checked (in the flow chart part of step S16), whether the indicator Occultation(i,j) is larger or equal to 0. If this is not the case, jl will be decremented until it is the case.

If the check in step S14 returns "no", the new position is below pixel(i,jr). Now according to step S17 "below=true" and "j_below=jl" will be set and jl incremented by 1. Furthermore, it will be checked (in the flow chart part of step S17), if the indicator Occultation(i,j) is larger or equal to 0. If this is not the case, jl will be incremented until it is the case.

After steps S15, S16 and S17 respectively, a backstep to step S11 is executed and the loop will be continued with a new check, whether it is "above=false" or "below=false".

Modifications of the above described method can be found by applying a different optimization strategy, for example if the pixel jl is not to be taken from the previous subpixel jr, the pixel jl will be taken instead from the previous row. In some cases, this can eliminate a few steps in finding the optimal pixel.

For example, it would be possible to merge the indicator Occultation and the pointer Whereto into one array. In case of a right occultation, it could be set Whereto(i,j):=−1. This indicates that there is no correspondence. A left occultation can be identified when Whereto(i,j_above)−Whereto(i,j_below)>1.

With a method according to the invention, a large number N of perspectives can be set, for example N=1024 or 2048, such that there will be completely new potentials for the 3D visualization of images.

This revealed that with an increasing number N of perspectives the images become clearer and the transition zones between the viewing zones will become smaller and smaller.

It could be thought that the image quality will be reduced, because fewer pixels will be available for each individual perspective. But this is not the case, because, for each eye of a viewer, the number of visible pixels depends on the size of the subpixel and the size and focal length of the lenticular lenses or parallax barriers. More perspectives are visible there. But these are more consistent, because their distance is smaller on the stereo basis.

A pseudo-holographic effect results, if the stereo basis between the left and right image is significantly large (for example 80-90 cm). In this case the viewer moves through the different viewing zones for a longer time and has a greater impression of "moving around" the object.

The methods described here are applicable for autostereoscopic displays as well as for autostereocopic adapter screens based on lenses or parallax barriers.

Furthermore, it is possible to execute the step of a correspondence analysis, not only where the images are presented, but also where the images are captured and to transmit it together with the stereo images using a data compression method (for example MPEG-4) to the location where it will be displayed.

Additionally, it is possible that the correspondence analysis will be generated by a transformation of a transmitted depth map.

Preferably, the method according to the invention can be executed by a computer program.

Figure 8:
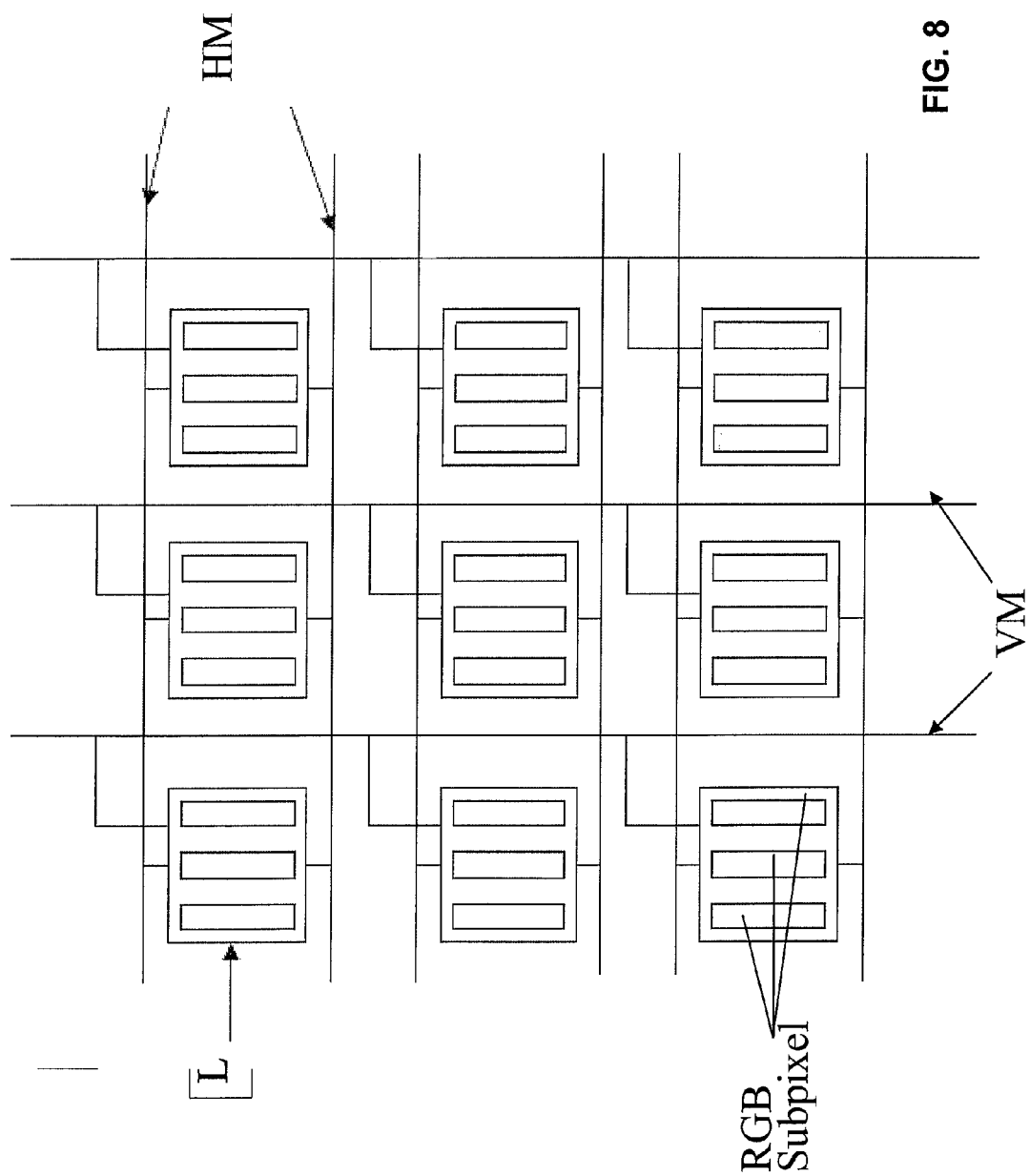
FIG. 8 is a schematic presentation of a matrix circuit for controlling every lens of an adapter screen above a pixel or sub pixel of a display.

The implementation of the methods according to the invention is possible for example according to FIG. 8 with a plurality of lenses L (especially nano lenses in liquid lens technology), placed in front of a pixel (RGB color) or subpixel (only R or G or B-color) of a display, where the lenses L will be controlled by a horizontal and vertical electronic matrix circuit VM and HM respectively, such that only those pixels of an underlying display which are needed for the visualization of the corresponding synthesized in-between images will be activated or created.

Figure 9:
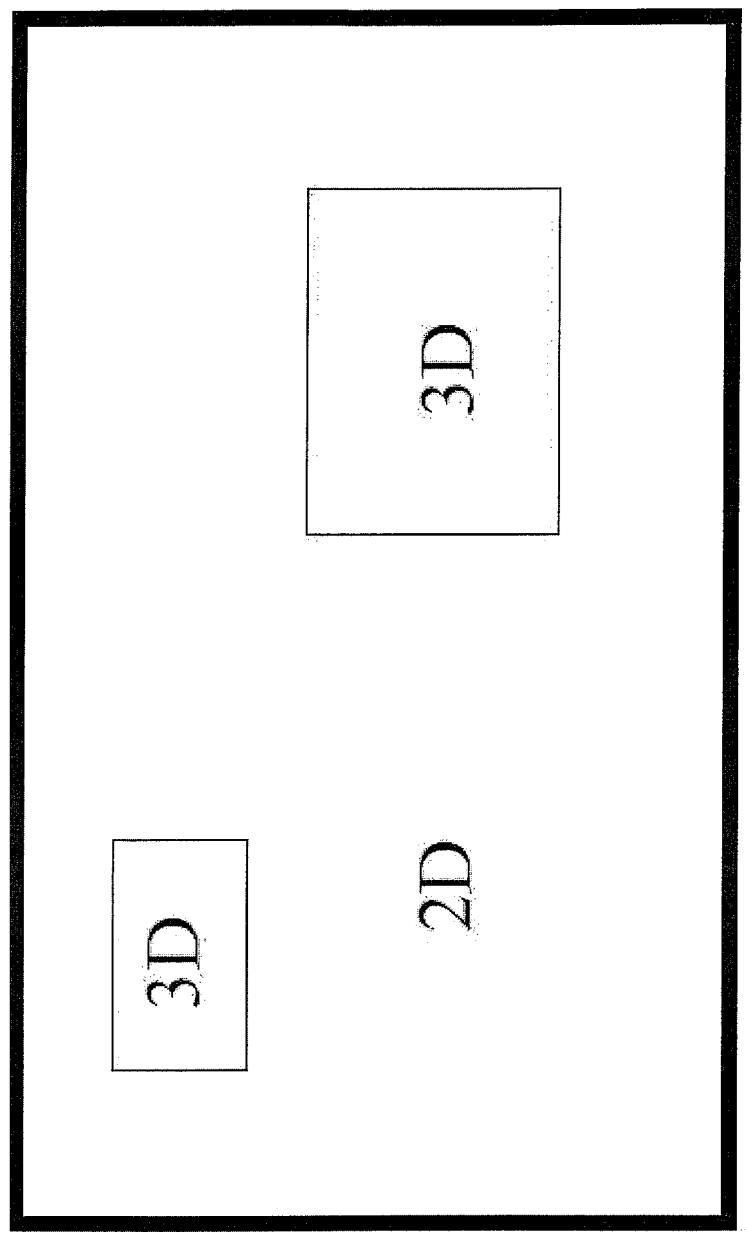
FIG. 9 is a schematic presentation of a display with regions for two dimensional or three dimensional visualization.

Because every pixel is individually controllable, certain areas of the display DA can be switched according to FIG. 9 into 3D mode, while other areas are still in 2D mode. For this purpose, the on and off impulse will be fed row and column sequentially. Only those lenses which receive the horizontal and vertical impulse at the same time will be switched on or off.

The invention claimed is:

1. A method for displaying three-dimensional images having a number N>2 perspective on an autostereoscopic display or an autostereoscopic screen, comprising:
  receiving fed images with a number M larger or equal to 2 perspectives, where M is less than N;
  analyzing each pixel B(i,j) of a fed image of a first perspective to determine a corresponding pixel B(i',j') in a second perspective or a right occultation, where i and i' are row indices and j and j' are column indices of the fed images;
  associating each pixel or subpixel of the display or screen with one of the M fed image perspectives or one of N minus M in-between perspectives;
  synthesizing the pixels or subpixels of the N minus M in-between perspectives associated with a pixel or subpixel of the display or screen through a virtual camera movement along a stereo basis between a pixel $B(i,j)$ of the fed image of the first perspective and the corresponding pixel $B(i',j')$ of the fed image of the second perspective, without synthesizing at least one of the pixels or subpixels of the N minus M in-between perspectives which is not associated with a pixel or subpixel of the display or screen; and displaying each associated pixel or subpixel of the display or screen on to the display or screen.

2. The method according to claim 1, wherein the fed images M=2 are a left image and a right image.

3. The method according to claim 2, further comprising choosing $\alpha_k$ supporting points with $0<\alpha_k<1$ for $k=1,\ldots N-2$ for the creation of N minus 2 in-between perspectives, where the pixels $B(i,j(\alpha_k))$ are to be combined to an in-between perspective.

4. A device for creating three-dimensional images having a number N>2 perspectives for visualization on an autostereoscopic display or an autostereoscopic screen, comprising:
an input for receiving fed images with a number M larger or equal to 2 perspectives, where M is less than N;
an analysis unit for analyzing each pixel $B(i,j)$ of a fed image of a first perspective to determine a corresponding pixel $B(i',j')$ in a second perspective or a right occultation, where i and i' are row indices and j and j' are column indices of the fed images;
a data structure containing data associating each pixel or subpixel of the display or screen with one of the M fed image perspectives or one of N minus M in-between perspectives; and
an image synthesis unit for synthesizing the pixels or subpixels of the N minus M in-between perspectives associated with a pixel or subpixel of the display or screen through a virtual camera movement along a stereo basis between a pixel $B(i,j)$ of the fed image of the first perspective and the corresponding pixel $B(i',j')$ of the fed image of the second perspective, without synthesizing at least one of the pixels or subpixels of the N minus M in-between perspectives which is not associated with a pixel or subpixel of the display or screen.

5. The device according to claim 4, wherein:
the analysis unit generates, for each pixel $B(i,j)$ of the fed image of the first perspective an occultation indicator and a whereto pointer;
where the occultation indicator indicates whether there is a corresponding pixel $B(i,j')$ in the fed image of a second perspective for the pixel $B(i,j)$ in the fed image of the first perspective or, whether there is a right occultation or a left occultation; and
where the whereto pointer holds, if the occulator occultation indicator indicates there is a corresponding pixel where i and i' are row indices and j and j' are column indices of the fed images.

6. A computer program product, the computer program product comprising:
a non-transient storage medium storing computer readable instructions;
the computer readable instructions including instructions for:
receiving fed images with a number M larger or equal to 2 perspectives, where M is less than N;
analyzing each pixel $B(i,j)$ of a fed image of a first perspective to determine either a corresponding pixel $(i',j')$ in a second perspective or a right occultation, where i and i' are row indices and j and j' are column indices of the fed images;
associating each pixel or subpixel of an autostereoscopic display or an autostereoscopic screen with one of the M fed image perspectives or one of N minus M in-between perspectives;
synthesizing the pixels or subpixels of the N minus M in-between perspectives associated with a pixel or subpixel of the display or screen through a virtual camera movement along a stereo basis between a pixel $B(i,j)$ of the fed image of the first perspective and the corresponding pixel $B(i',j')$ of the fed image of the second perspective, without synthesizing at least one of the pixels or subpixels of the N minus M in-between perspectives which is not associated with a pixel or subpixel of the display or screen; and
transmitting each associated pixel or subpixel of the display or screen to the display or screen.

7. The method according to claim 2, further comprising during the synthesis step synthesizing a whereto pointer which identifies the corresponding pixel $B(i',j')$ in the second perspective.

8. The method according to claim 7, further comprising a correspondence analysis by a transformation of a transmitted depth map.

9. The method according to claim 1, further comprising a step of receiving the number N from a user.

10. The device according to claim 4, wherein the analysis unit generates for each pixel $B(i,j)$ of the fed image of the first perspective a whereto pointer where the whereto pointer $(i,j)=j'$ when there is a corresponding pixel $B(i,j')$ of the fed image of the second perspective.

11. The method according to claim 1, wherein the step of associating each pixel or subpixel of the display or screen with one of the M fed image perspectives or one of N minus M in-between perspectives comprises a matrix $R(i,j)$ which identifies the perspective for each pixel or subpixel of the display or screen.

12. The method according to claim 1, further comprising receiving fed correspondences between pixels $B(i,j)$ of the fed image of the first perspective and pixels $B(i',j')$ of the fed image of the second perspective.

13. The method according to claim 12, wherein the step of analysing analyzing comprises determining a corresponding pixel $B(i,j)$ in the second perspective from the fed correspondences.

14. The method according to claim 1, wherein determining a corresponding pixel $B(i,j)$ in the second perspective comprises a search process.

\* \* \* \* \*

UNITED STATES PATENT AND TRADEMARK OFFICE
CERTIFICATE OF CORRECTION

PATENT NO. : 8,633,967 B2  Page 1 of 1
APPLICATION NO. : 12/298020
DATED : January 21, 2014
INVENTOR(S) : Kamins-Naske et al.

It is certified that error appears in the above-identified patent and that said Letters Patent is hereby corrected as shown below:

In the Specifications

In Column 1, Line 66, delete "FIG. 3" and insert -- FIGS. 3A and 3B --, therefor.

Figure 4B:
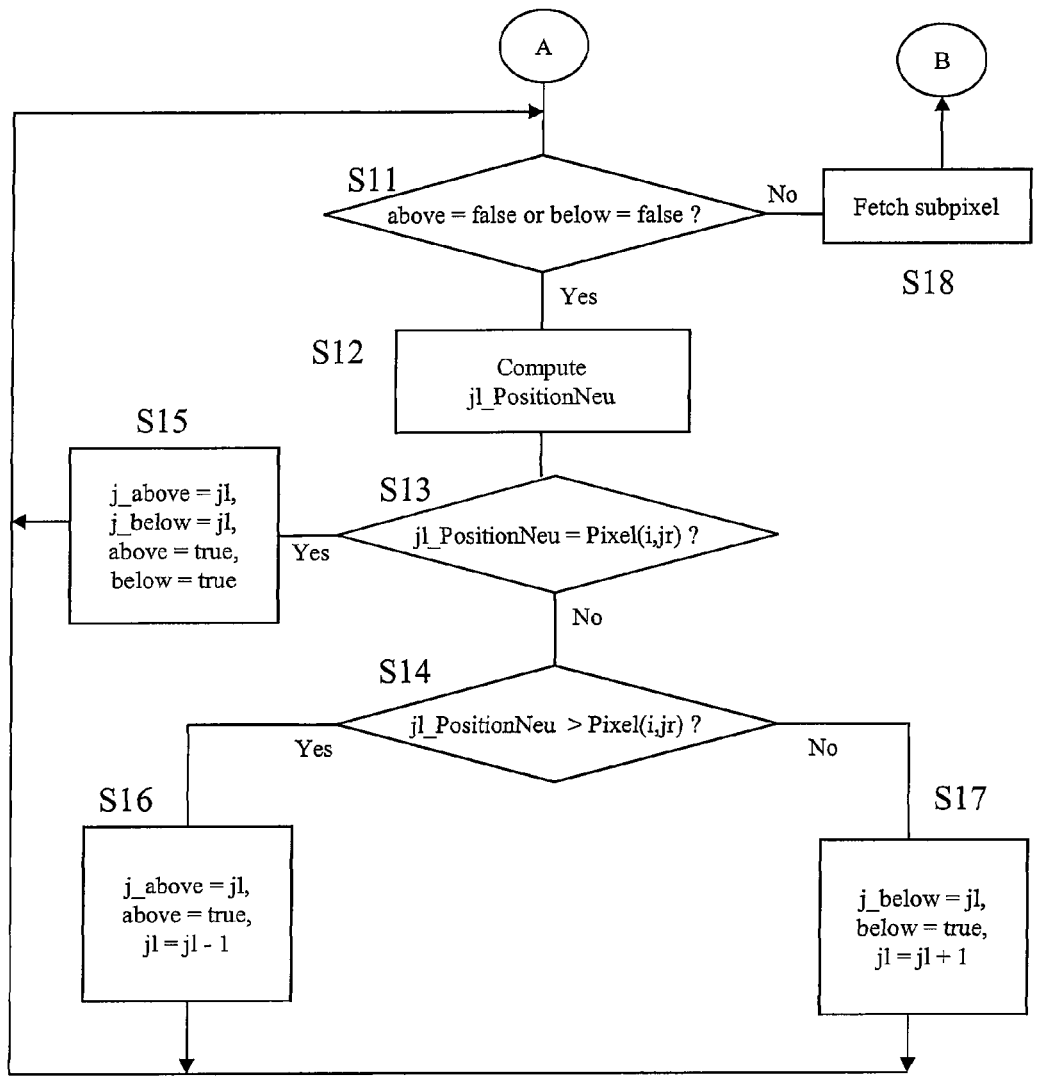

In Column 2, Line 1, delete "FIG. 4" and insert -- FIGS. 4A and 4B --, therefor.

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,633,967 B2  Page 1 of 1
APPLICATION NO. : 12/298020
DATED : January 21, 2014
INVENTOR(S) : Kamins-Naske et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this
Twenty-second Day of September, 2015

Michelle K. Lee
*Director of the United States Patent and Trademark Office*